(12) United States Patent
Zo

(10) Patent No.: US 8,160,621 B2
(45) Date of Patent: Apr. 17, 2012

(54) METHOD FOR WRITING A CHARACTER MESSAGE IN A MOBILE TELECOMMUNICATION HANDSET AND MOBILE TELECOMMUNICATION HANDSET CAPABLE OF WRITING A CHARACTER MESSAGE

(75) Inventor: Wo-No Zo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1311 days.

(21) Appl. No.: 11/625,167

(22) Filed: Jan. 19, 2007

(65) Prior Publication Data

US 2007/0191037 A1    Aug. 16, 2007

(30) Foreign Application Priority Data

Feb. 10, 2006 (KR) .................. 10-2006-0013276

(51) Int. Cl.
H04W 4/00       (2009.01)
(52) U.S. Cl. ........ 455/466; 345/581; 345/582; 345/636; 345/629; 345/467; 345/469
(58) Field of Classification Search .................. 455/466, 455/550.1, 227; 345/581, 582, 636, 629, 345/467, 469, 470
See application file for complete search history.

(56) References Cited

U.S. PATENT DOCUMENTS

| | | | | |
|---|---|---|---|---|
| 4,709,348 A | * | 11/1987 | Horn et al. ............... | 715/205 |
| 5,815,142 A | * | 9/1998 | Allard et al. ............... | 345/173 |
| 6,128,633 A | * | 10/2000 | Michelman et al. ........ | 715/210 |
| 6,665,711 B1 | * | 12/2003 | Boyle et al. ............... | 709/219 |
| 7,124,164 B1 | * | 10/2006 | Chemtob .................. | 709/204 |
| 2001/0034849 A1 | * | 10/2001 | Powers ..................... | 713/202 |
| 2003/0104839 A1 | * | 6/2003 | Kraft et al. ................ | 455/566 |
| 2004/0015547 A1 | * | 1/2004 | Griffin et al. ............. | 709/204 |
| 2004/0015548 A1 | * | 1/2004 | Lee ......................... | 709/204 |
| 2004/0038670 A1 | * | 2/2004 | Ando et al. ............... | 455/412.1 |
| 2004/0038691 A1 | * | 2/2004 | Shin ........................ | 455/466 |
| 2004/0248598 A1 | * | 12/2004 | Ding et al. ................ | 455/466 |
| 2004/0266412 A1 | * | 12/2004 | Maes et al. ............... | 455/414.4 |
| 2006/0009243 A1 | * | 1/2006 | Dahan et al. .............. | 455/466 |
| 2006/0056334 A1 | * | 3/2006 | Yuan et al. ................ | 370/328 |
| 2006/0099978 A1 | * | 5/2006 | Kim et al. ................. | 455/466 |
| 2006/0128404 A1 | * | 6/2006 | Klassen et al. ............ | 455/466 |

FOREIGN PATENT DOCUMENTS

KR    20040059917    *    7/2004

* cited by examiner

*Primary Examiner* — Kamran Afshar
*Assistant Examiner* — Edward Zhang
(74) *Attorney, Agent, or Firm* — Lee, Hong, Degerman, Kang & Waimey

(57) ABSTRACT

A method for writing a character message in a mobile telecommunication handset, including writing a message, inputting a page divider transferring a current page to a next page at any area of the current page on which the message is being written, displaying page information on the message, transmitting the written message, determining if the page divider is inputted, enabling the current page on which to write the short message to be changed if the page divider is input; and displaying the updated page information on the short message if the current page is changed. Thus, it is possible to change a current page at any area of the current page during the writing of a short message, and continue to write the short message on a new page of a message-writing window during the writing of the short message.

13 Claims, 6 Drawing Sheets

There is none like you. No one else can touch my heart like you do.
I could search for all eternity long and find. There is none like you.

[EXAMPLE TEXT TO BE WRITTEN ON MESSAGE-WRITING WINDOW]

PUSH "SYMBOL" KEY BUTTON TO INPUT PAGE DIVIDER

FIG. 3A
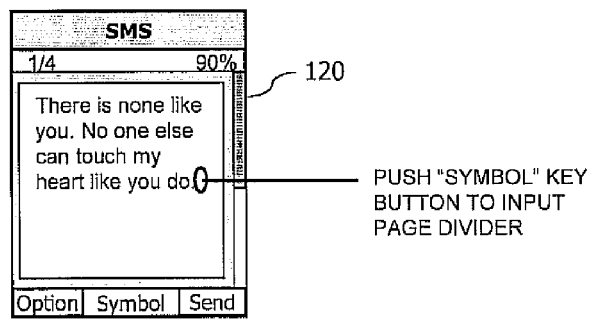
[EXAMPLE TEXT TO BE WRITTEN ON MESSAGE-WRITING WINDOW]
FIG. 3B
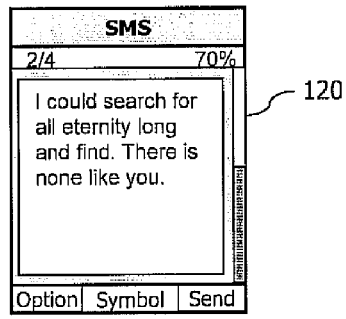
FIG. 3C
FIG. 3D
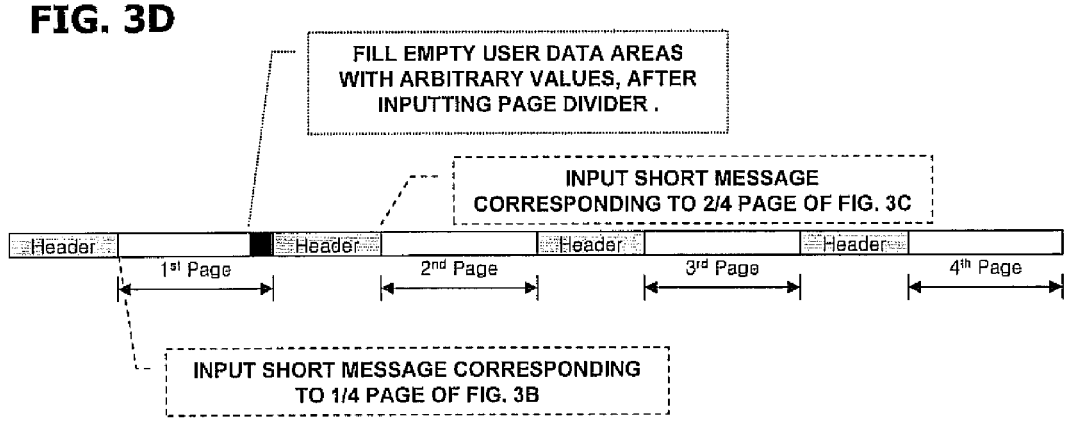

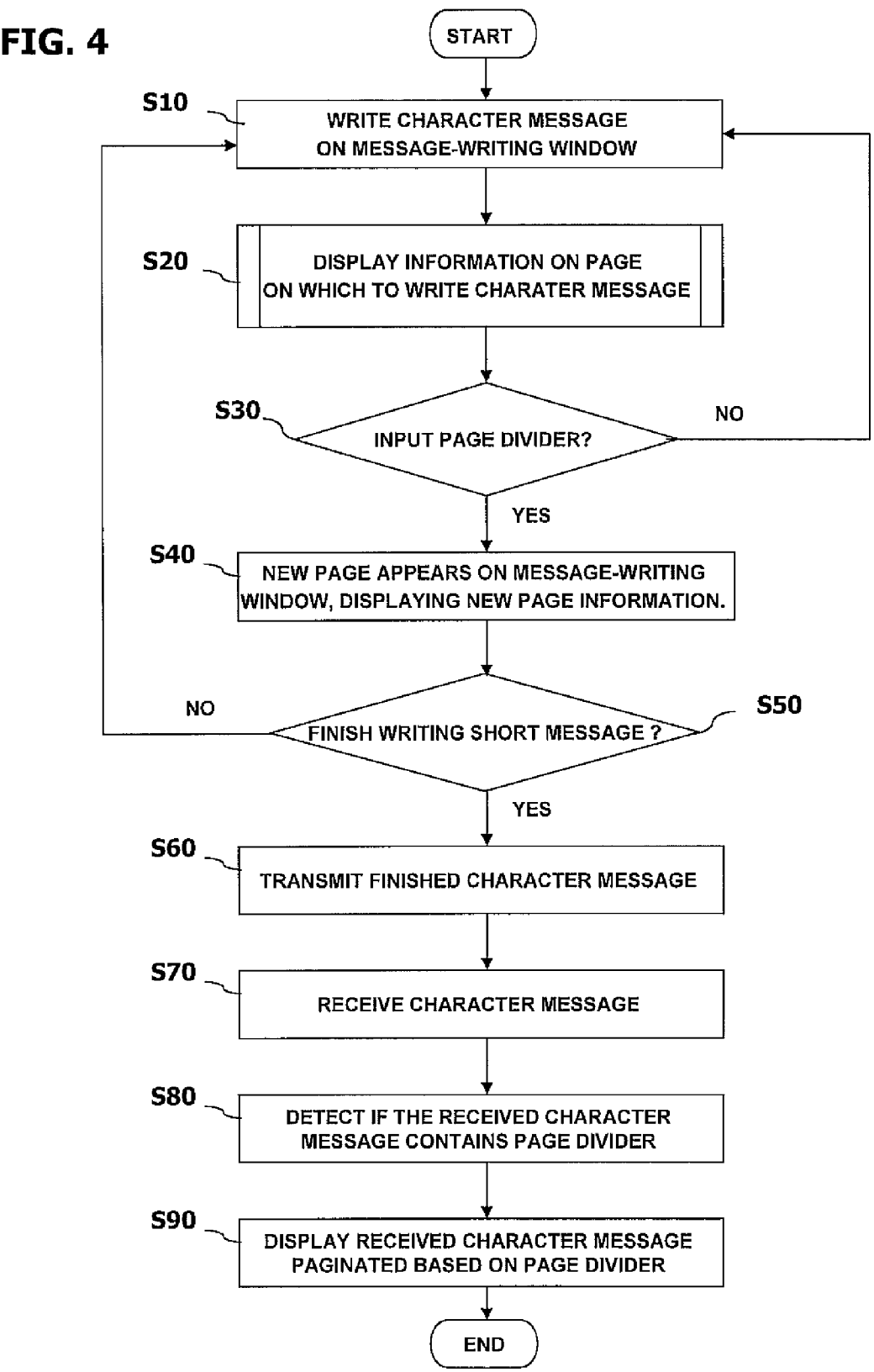

PRESS "SYMBOL" KEY BUTTON TO INPUT PAGE DIVIDER

INPUT SHORT MESSAGE CORRESPONDING TO 2/5 PAGE OF FIG. 3C

50%: 50% OF TOTAL 5 PAGES CONSISTING OF PACKETS OF 4 OF TPDU AS SHOWN IN FIG. 6B IS COMPLETED

METHOD FOR WRITING A CHARACTER MESSAGE IN A MOBILE TELECOMMUNICATION HANDSET AND MOBILE TELECOMMUNICATION HANDSET CAPABLE OF WRITING A CHARACTER MESSAGE

CROSS-REFERENCE TO RELATED APPLICATION

Pursuant to 35 U.S.C. §119(a), this application claims the benefit of earlier filing date and right of priority to Korean Application No. 10-2006-0013276 filed on Feb. 10, 2006, the contents of which are hereby incorporated by reference herein in their entirety.

BACKGROUND OF THE INVENTION

1. Field of the Invention

The present invention is directed to a writing of a character message for a mobile telecommunication handset, and more specifically, to a method for writing a short message in the mobile telecommunication handset capable of performing a function of page division during the writing and reading of the short message and a mobile telecommunication handset capable of performing the function of page division during the writing and reading of the short message

2. Description of the Related Art

A wireless mobile service provider provides moving pictures, voice, and character services. It provides news, weather forecast, and stock-price information using a short message service (SMS), one of the character services. The SMS is a two-way character service in which a short message is transmitted and received between the mobile telecommunication handsets without necessitating a call connection.

A short message, when transmitted over a network, is divided into message pages, each of which corresponds to one transfer protocol data unit (1 TPDU). The mobile telecommunication handset transmits and receives the short message contained in the TPDU between short message service centers (SMSCs). This is known as a physical paging. The 1 TPDU, i.e., 1 physical page, contains up to 7,160 characters of GSM7, 80 characters of UCS2, or 40 Korean characters, when writing a short message.

The message page in a current structure of the TPDU is described in detail as follows.

FIG. 1A is a block diagram illustrating the structure of the TPDU in wide use.

FIG. 1B is a block diagram illustrating data packets of the short message having 4 TPDUs As shown in FIG. 1A, the 1 TPDU consists of a header and a user data area. The 1 TPDU currently constitutes one page of the short message. An actual short message is included in the user data area. As shown in FIG. 1B, 4 pages of the short message need 4 TPDUs.

However, as shown in FIG. 1B, a user cannot arbitrarily turn over a page in writing the short message using the conventional short message service. More specifically, until the user fills a user data area of a current TPDU with characters, he/she cannot go to the user data area of the next TPDU to continue his/her writing, through the use of the TPDUs having the same structure as shown in FIG. 1B. That is, pages are divided separately based on the physical structure of the TPDU.

As a result, a sentence which the user wrote can be broken into two or more parts, extending over two or more pages. So, the user has to switch between the two pages to read the full sentence using a scroll key. This results from the fact that the data packet, i.e., the TPDU is based on the physical page concept, not a user interface concept.

The separation of pages based on the physical structure of the TPDU does not satisfy the user's increasing need to begin a new sentence on the next page for editing purpose.

BRIEF DESCRIPTION OF THE INVENTION

An object of the present invention is to provide a method for writing a short message in a mobile telecommunication handset having the capability of changing a current page to a next page at any area of the current page to continue the writing on the next page, and a mobile telecommunication capable of changing the current page to the next page at any area of the current page to continue the writing on the next page.

Another object of the present invention is to provide a method for using a logical page technique based on a graphical user interface instead of a conventional physical page technique based on the TPDU, as a unit of message transmission, in changing a current page to a next page at any area of the current page to continue the writing on the next page.

According to an aspect of the present invention, there is provided a method for writing a short message in a mobile telecommunication handset, including writing the short message, inputting a page divider transferring a current page to a next page at any area of the current page on which the short message is being written, displaying page information on the short message and transmitting the written short message.

The method for writing the short message may further include determining if the page divider transferring the current page to the next page is input, enabling the current page on which to write the short message to be transferred to the next page if the page divider is input, and displaying the page information on the short message, updated based on the transfer of the current page to the next page.

According to another aspect of the present invention, there is provided a method for writing a short message including receiving a short message, detecting if the short message includes a page divider for transferring a current page to a next page, and displaying the received short message which is paginated based on the page divider.

According to another aspect of the present invention, there is provided a mobile telecommunication handset, including a keypad having a key button inputting a page divider, a display providing a message-writing window on which to write a short message, a computation unit generating page information to be displayed, and a control unit enabling a current page to be transferred to a next page on the message-writing window through the use of the page divider input from the key button of the keypad and enabling the page information generated by the computation unit to be displayed to an area of the message-writing window.

The foregoing and other objects, features, aspects, and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A to 3C illustrate screen configurations of a message-writing window of the mobile telecommunication handset according to the first embodiment of the present invention.

FIG. 3D illustrates data packets of a short message consisting of 4 TPDUs according to a first embodiment of the present invention.

FIG. 4 is a flow chart of a method for writing a short message according to the first embodiment of the present invention.

DETAILED DESCRIPTION OF THE INVENTION

The present invention is embodied in a mobile telecommunication device, but not limited thereto. The present invention finds its application in a wireless mobile telecommunication handset complying with standards and specifically in a multimedia telecommunication handset having functions of transmitting and receiving a short message, such as a DMB telecommunication handset, a PDA telecommunication handset, a DVB telecommunication handset, and a media FLO telecommunication handset.

A basic concept of the present invention is that a page divider is input on a current page when it is needed to write a new sentence on a new page on the message-writing window when writing a short message with several pages. That is, the input of page dividers at any area of the current page makes it possible to change a unit of page from the physical-page-based TPDU to the logical-page-based graphical user interface.

The page divider comes in two different forms. There is a first embodiment in which one page divider is input per 1 TPDU and a second embodiment in which at least one or more of the page dividers are input per 1 TPDU. The two embodiments will be separately described later.

Reference will now be made in detail to the preferred embodiments of the present invention, examples of which are illustrated in the accompanying drawings.

Figure 1A:
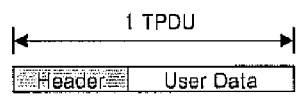
FIG. 1A is a block diagram of a structure of a general TPDU.
Figure 1B:
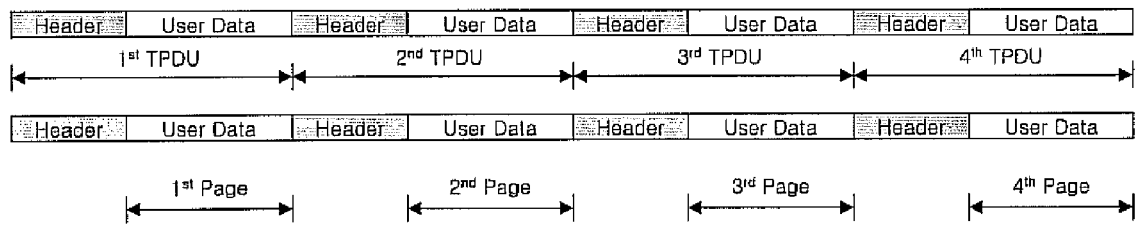
FIG. 1B is a block diagram of data packets of a short message having 4 TPDUs.
Figure 2:
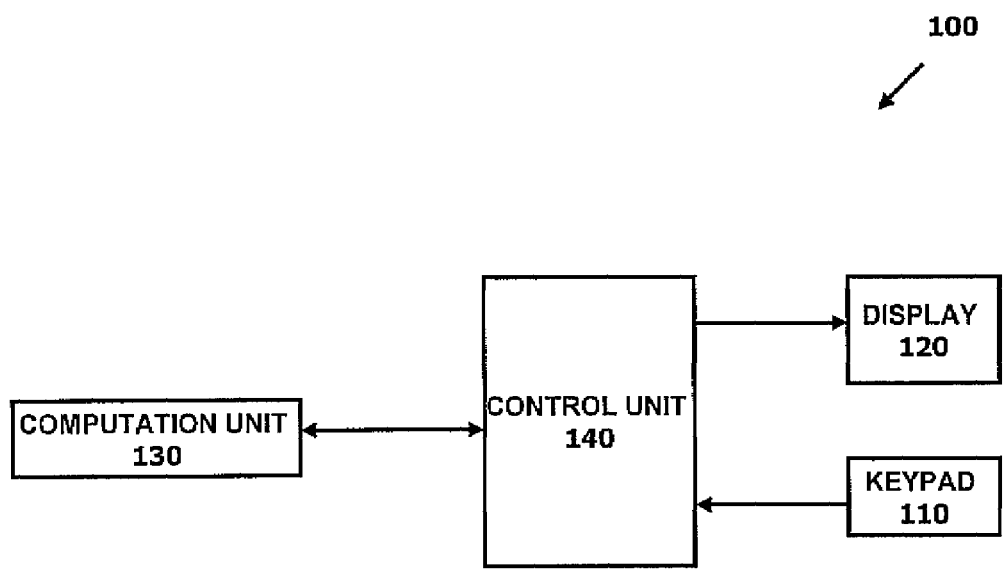
FIG. 2 is a schematic block diagram of a mobile telecommunication handset capable of writing a short message according to an embodiment of the present invention.

FIG. 2 is a schematic block diagram of a mobile telecommunication handset capable of writing a short message according to an embodiment of the present invention. The schematic block diagram is not limited to illustrated elements, but includes all elements of the ordinary mobile telecommunication handset (even if not shown) such as a memory unit storing various data and control programs, a transmitting/receiving unit transmitting and receiving the data, and a speaker outputting a bell sound, a voice and anything else.

Referring to FIG. 2, a mobile telecommunication handset 100 according to the present invention includes a key pad 110 including a key button inputting a page divider, a display 120 providing a message-writing window on which to write a short message, a computation unit 130 generating page information to be displayed, and a control unit 140 enabling a current page to be transferred to a next page on the message-writing window through the use of the page divider input from the key button of the keypad and enabling the page information generated by the computation unit 130 to be displayed to an area of the message-writing window.

The control unit 140 determines if the page divider is input and enables a new page to appear on the message-writing window when the page divider is input. When the mobile telecommunication handset 100 (the receiving handset) receives a short message from another mobile telecommunication handset (the transmitting handset), the control unit 140 of the mobile telecommunication handset 100 (the receiving handset) detects if the received message includes the page divider.

A first embodiment in which the one page divider is input into the 1 TPDU is described as follows.

FIGS. 3A to 3C are drawings illustrating a screen configuration of a message writing window of the mobile telecommunication handset according to the first embodiment of the present invention.

FIG. 3D illustrates data packets of a short message consisting of 4 TPDUs according to the first embodiment of the present invention.

FIG. 4 is a flow chart illustrating a method for writing a short message according to the first embodiment of the present invention.

Figure 5:
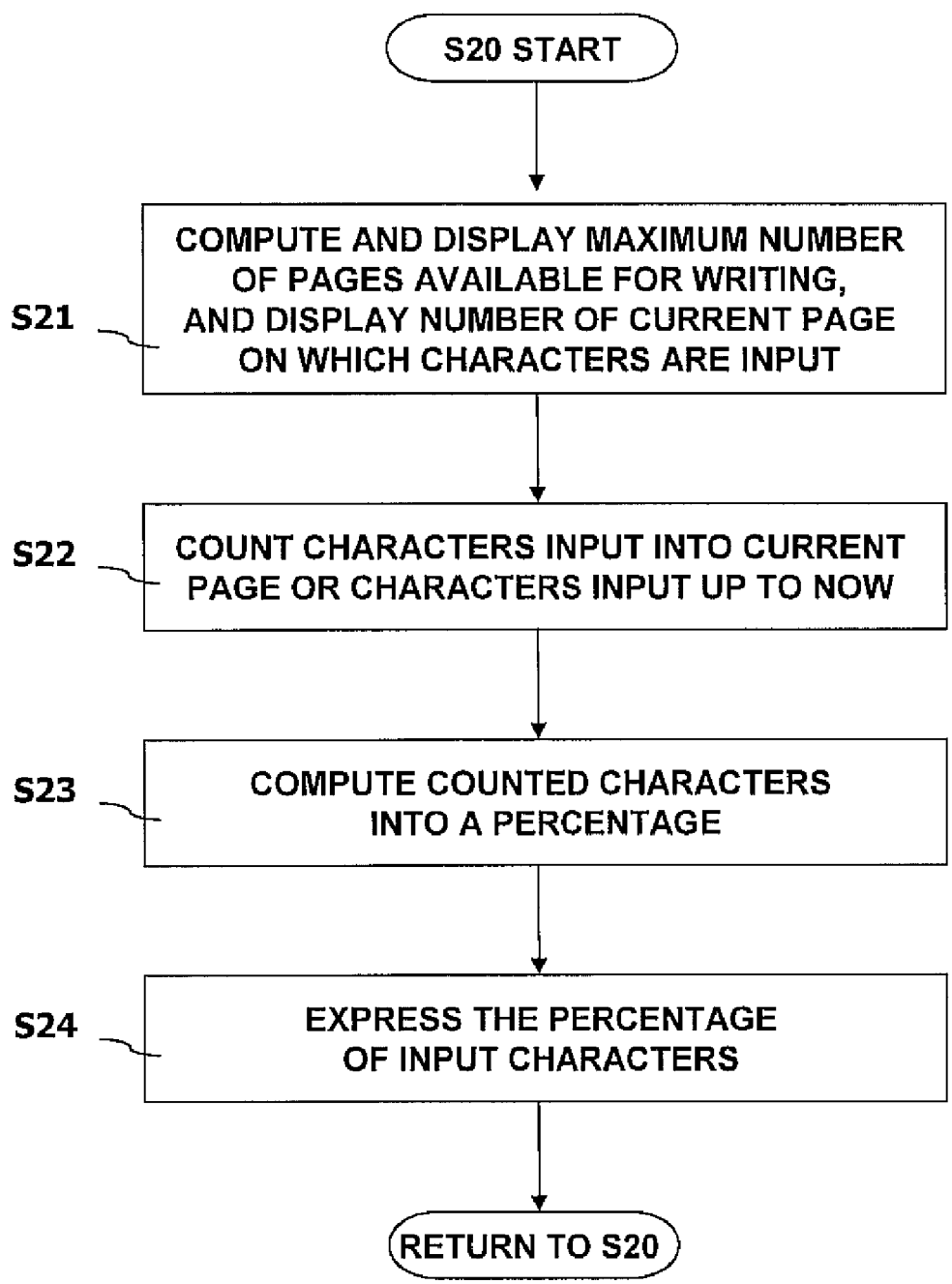
FIG. 5 is a flow chart of a sub-routine of S20 shown in FIG. 4 according to the first embodiment of the present invention.

FIG. 5 is a flow chart illustrating a sub-routine of S20 shown in FIG. 4 according to the first embodiment of the present invention.

Referring to FIGS. 2 to 5, the user selects "SMS writing" from a menu to write a short message when he/she wants to write the short message using the mobile telecommunication handset 100 (S10). Suppose that the user wants to write a short message like a sentence shown in FIG. 3A. The user will press corresponding key buttons of the keypad 110 to input characters which constitute the sentence.

As shown in FIG. 3B, a current page number, e.g. "1", on which the short message is being written and the maximum number of pages, e.g. "4", available for writing are displayed on the display 120. The current page number, e.g. "1", and the maximum number of pages, e.g. "4", are expressed based on the TPDU. At the upper rightmost corner of the message-writing window on the display 120 is displayed a percentage, e.g. "90%", of characters, e.g., "There is none like you. No one else can touch my heart like you do.", as shown in FIG. 3B, input on the current page "1", compared with the maximum number of characters permitted per the current page, e.g. "1", (S20).

Furthermore, the computation unit 130 of the mobile telecommunication handset 100 calculates the maximum number, e.g. "4", as shown in FIG. 3B of pages permitted per the TPDU and displays the maximum number on the display 120 (S21). The number, e.g. "1", as shown in FIG. 3B, of the page on which the short message is being written is displayed at a specific region of the message-writing window, e.g. "1/4", at the upper leftmost corner of the message-writing window as shown in FIG. 3B (S22). The computation unit 130 computes the number of characters input on the page on which the short message is written and displays a percentage of input characters (S23). The computation unit 130 displays the percentage, e.g. "90%", (S24)

Subsequently, the page divider can be input to write a following sentence "I could search for all eternity long and find. There is none like you" on the next page. A certain key of the key pad 110 is preset to perform a function of inputting the page divider, e.g. "Symbol". The page divider, e.g. "Symbol", is input at any area of the current page by pressing the key button which is assigned to perform the function of inputting the page divider, when it is needed to transfer the current page to the next page.

The control unit 140 determines if the page divider, e.g. "Symbol", is input (S30). The control unit 140 enables a new page to appear on a next page on the message-writing window and enables information on the next page to be displayed (S40).

Referring to FIGS. 3C and 3D, operation S40 is described in detail as follows. FIG. 3C illustrates an on-screen image of the new page on the message-writing window as a result of performing the operation S40. FIG. 3D illustrates data packets of the short message consisting of 4 TPDUs in the case where the page divider is input at the operation S40. For example, when the page divider, e.g. "Symbol", is input, the next page, i.e., corresponding user data area of the second TPDU, appears on the message-writing window without inputting any data into a user data area of the first TPDU, as shown in FIG. 3D. At this point, the empty user data area of the first TPDU is filled with arbitrary values as shown in FIG. 3D, when the page divider is input. Accordingly, the user continues to write his/her short message on the new page, 2/4, as shown in FIG. 3C. FIG. 3C illustrates the on-screen image of the new page, 2/4, on which the subsequent sentence "I could search for all eternity long and find. There is none like you" is entirely written. An updated page information, e.g., "2/4" and "70%", is displayed. The "70%" is a percentage of characters, e.g., "I could search for all eternity long and find. There is none like you", input on the current page "2/4", compared with the maximum number of characters permitted per the second page.

As described above, the user continues his/her writing on the message-writing windows to complete the short message (S50) and thereafter transmits the short message to the receiving mobile telecommunication handset (S60).

The receiving mobile telecommunication handset receives the message transmitted from the transmitting mobile telecommunication handset at the operation S60 (S70). The control unit 140 of the receiving mobile telecommunication handset detects if the page divider is contained in the received message (S80). The pages of the received message paginated based on the page divider are displayed on the display 120 (S90).

In a second embodiment of the present invention, at least one or more page dividers are input into 1 TPDU, and is described as follows.

Figure 6A:
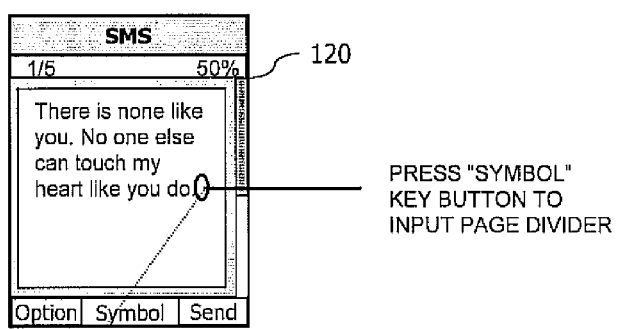
FIG. 6A illustrates an on-screen image of a message-writing window according to a second embodiment of the present invention.

FIG. 6A is a drawing illustrating an on-screen image of a message-writing window according to the second embodiment of the present invention.

Figure 6B:
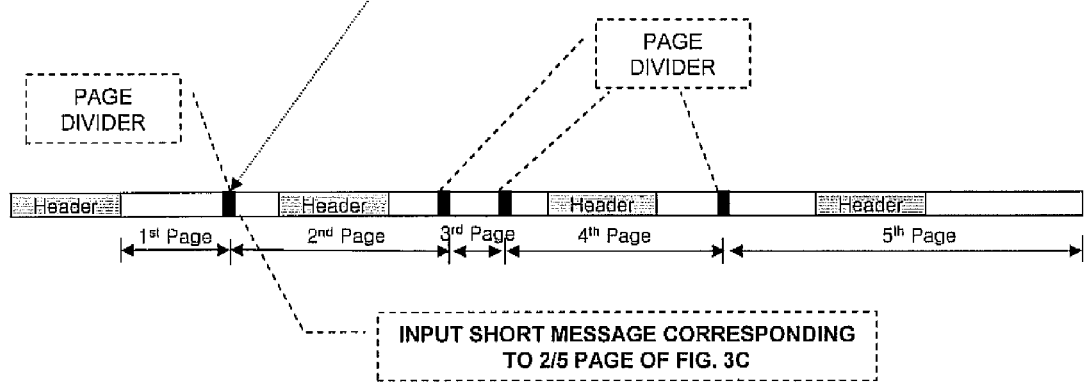
FIG. 6B illustrates a configuration of packets in which the page dividers are input into a short message having 4 TPDUs according to the second embodiment of the present invention.

FIG. 6B is a drawing illustrating a configuration of packets in which page dividers are input into a short message having 4 TPDUs according to the second embodiment of the present invention.

Figure 6C:
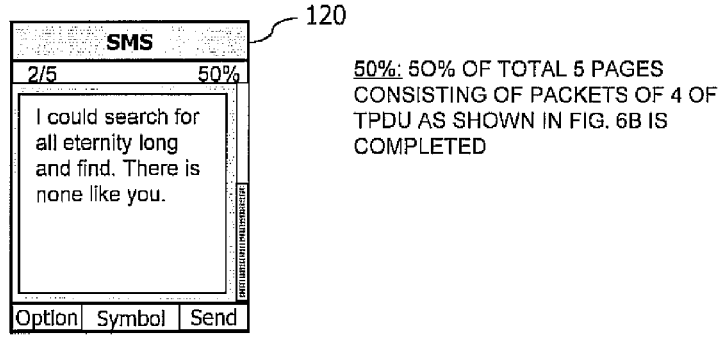
FIG. 6C illustrates a second page on the message-writing window according to the second embodiment of the present invention.

FIG. 6C is a drawing illustrating the second page on the writing window according to the second embodiment of the present invention.

The second embodiment, like the first embodiment, goes through the operation as shown in FIG. 4. There are several features which distinguish the second embodiment from the first embodiment. The first feature of the second embodiment is that at least 1 or more page dividers can be input into 1 TPDU. The second feature is that the input of the page divider into the user data area of the TPDU does not require an automatic transfer to the corresponding page of the next TPDU.

When a specific page divider is input into a user data area of a certain TPDU, for example, the first TPDU, as shown in FIG. 6B, the new page begins next to the page divider input into the user data area. Therefore, unlike the first embodiment, the empty user data area is not filled with arbitrary values. It is possible to continuously input characters in the empty user data area, because only the current page on which characters is being input is changed.

The third feature is related to the page information displayed on the message-writing window. FIGS. 6A to 6C illustrate that four page dividers are input into packets having 4 TPDUs, as shown in FIG. 6B, and a total of five pages are generated. That is, as seen from the page information shown in FIG. 6A, a total of five pages have currently been generated and one page is being written. FIG. 6C illustrates that the second page, shown as "2/5" in FIG. 6C, is being written. The page information, "50%" shown at the upper rightmost corner of the writing window, indicates that 50% of the maximum number of characters permitted in packets having 4 TPDUs is used.

These features of the second embodiment are useful for editing the short message, such as dividing pages, after finishing the writing of the short message. When the page divider, e.g. "Symbol", is input during the writing of the short message, for example, if the user is writing on "5/5" pager then a changed page information, "6/6" is displayed on the message-writing window.

Referring to the flow chart of FIG. 4, the second embodiment of the present invention is described as follows. The operation shown in FIG. 4 is also applied to the second embodiment. For the purpose of consistency, the description of the first embodiment is omitted.

A short message is written on the message-writing window displayed on a display 120 of a mobile telecommunication handset 100 (S10). A page divider "Symbol" is input to write a sentence on a new page during the writing of the short message. Also, the page divider is input into any area of the pages to edit the short message, such as division of a page, after completing the short message. During the writing of the short message, the information on the page on which characters are being input is displayed at a specific region of the message-writing window (S20).

With reference to FIGS. 6B and 6C, the page information displayed during the operation S20 includes a current page, "2", on which characters are input, the maximum number of pages, "5", and a percentage, "50%", of input characters, compared with the maximum number of characters permitted in packets as shown in FIG. 6B. The number of pages is obtained by adding "1" to the number of the page divider. If the number of the page divider is "X", then the number of pages is "X+1". The operation, such as this is performed by a computation unit 130 according to control of a control unit 140 of the mobile telecommunication handset 100.

The second embodiment, like the first embodiment, goes through the operations S30 to S50 and S60 to S90 shown in FIG. 4.

The above described method for writing a short message is twofold. First, after finishing writing a short message regardless of the pagination, the page divider is input into an area of the page to be divided. This method is favorably used in the second embodiment.

Second, to write a sentence on a new page, during the writing of the short message, the page divider is input into an area of a current page. The page divider is input into an area of the current page from which to begin a new page, referring to the current page number and the percentage of the input characters which are displayed on the message-writing window during the writing of the short message.

The above-described embodiments in which the short message is written on the message-writing window display of the mobile telecommunication handset are employed for understanding the present invention. Thus, the present invention is not limited to the SMS, but may be applied to all methods for transmitting the short message through the mobile telecommunication handset, such as Multimedia Message Service (MMS) and email.

Service providers, who provide message transmission services such as an SMS, may provide a user, i.e., a subscriber with one of the first embodiment and the second embodiment, depending upon their policy.

The page divider may be input into a header area of the TPDU, as well as the user data area of the TPDU. When the page divider is input into the header area of the TPDU, the page divider includes additional information on which part of the user data area a new page is generated. The additional information may include an address of a certain area, such as an address expressed as a byte. The additional information may not be included in the page divider, but may be independently handled.

A method for writing a short message according to the present invention provides an advantage of writing the short message based on a logical page concept of a TPDU, instead of a physical page concept of a graphical user interface. That is, it is possible to change a current page at any area of the current page during the writing of a short message, and continue to write the short message on a new page on a message-writing window during the writing of the short message. Thus, the editing of the short message is made possible in a way that meets a user's need. It is also possible to divide a short message into the desirable number of pages without breaking a sentence and to review the written short message without the broken sentence.

It is also possible to avoid a problem with a conventional method that a change of a current page in writing the short message causes a sentence to be broken into two or more parts and extend over two or more pages.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims. For example, the page divider may be input using a touch-screen, a touch pad, a joystick key, a ball mouse, or anything else. That is, the specific key button for inputting the page divider includes all keys of that kind.

What is claimed is:

1. A method for writing a character message in a mobile telecommunication handset, the method comprising:
    receiving text input via a keypad of the mobile telecommunication handset, the received text input comprising the character message on a message-writing window of the mobile telecommunication handset;
    displaying text corresponding to the text input on an initial on-screen display area of the message-writing window;
    detecting a display area change input indicating that text corresponding to subsequent text input is to be displayed on at least one subsequent on-screen display area of the message-writing window;
    receiving the subsequent text input via the keypad, the received subsequent text input comprising a continuation of the character message on the message-writing window;
    displaying the text corresponding to the subsequent text input on the at least one subsequent on-screen display area of the message-writing window;
    displaying a bar icon along an edge of an on-screen display area on the message writing window to indicate an existence of text within both the initial on-screen display area and the at least one subsequent on-screen display area;
    displaying a count number on the message-writing window related to an amount of text input for the character message; and
    transmitting the character message via a mobile communications network after composition of the message on the message-writing window has been completed.

2. The method of claim 1, wherein each of the at least one subsequent on-screen display area provides a page view such that the initial on-screen display area shows an initial page of the character message and each of the at least one subsequent on-screen display area shows a subsequent page of the character message.

3. The method of claim 2, wherein the display area change input is a page divider input.

4. The method of claim 3, further comprising:
    displaying, on the message-writing window, a current page number and a total number of pages of the character message.

5. The method of claim 4, further comprising:
    displaying, on the message-writing window, a percentage related to an amount of text inputs for the character message.

6. A mobile terminal comprising:
    an input device configured to receive text inputs via a keypad in order to allow a user to begin composing a message on a message-writing window;
    a display configured to display the text inputs on an initial on-screen display area of the message-writing window; and
    a controller configured to cooperate with the input device and the display in order to:
        detect a display area change indication indicating that subsequent text inputs are to be displayed beyond the initial on-screen display area,
        receive the subsequent text inputs via the keypad in order to allow the user to continue composing the message on the message-writing window,
        display the subsequent text inputs on at least one subsequent on-screen display area of the message-writing window,
        display a bar icon along an edge of an on-screen display area on the message-writing window to indicate an existence of text within both the initial on-screen display area and the at least one subsequent on-screen display area,
        transmit the message via a mobile communications network after composition of the message on the message-writing window has been completed, and
        display a count number on the message-writing window related to an amount of text inputs for the message.

7. The mobile terminal of claim 6, wherein each of the initial on-screen display area and the at least one subsequent on-screen display area provides a page view such that the initial on-screen display area shows an initial page of the message and each of the at least one subsequent on-screen display area shows a subsequent page of the message.

8. The mobile terminal of claim 7, wherein the display area change indication is a page divider indication.

9. The mobile terminal of claim 8, wherein the controller is further configured to cooperate with the input device and the display in order to display, on the message-writing window, a current page number and a total number of pages of the message.

10. The mobile terminal of claim 9, wherein the controller is further configured to cooperate with the input device and the display in order to display, on the message-writing window, a percentage related to an amount of text inputs for the message.

11. The mobile terminal of claim 6, wherein at least the input device or the keypad is configured to support touch screen inputs.

12. An apparatus comprising:
  a keypad configured to receive user inputs via a touch-screen in order to allow text message creation in a message-writing window;
  a display screen configured to support reception of the user inputs via the touch-screen and to display the user inputs on a starting screen region of the message-writing window; and
  a processor configured to cooperate with the keypad and the display screen in order to:
    detect an input of a screen region change indicator via the keypad,
      wherein the screen region change indicator denotes that next user inputs are to be shown on a next screen region of the message-writing window,
    receive the next user inputs via the keypad in order to continue text
    message creation in the message-writing window, and
    display the next user inputs on the next screen region of the message-writing window,
  wherein the display screen is further configured to show, upon completion of text message creation in the message-writing window, a graphic icon used in activating procedures that are controlled by the processor in order to transmit text messages using a short message service (SMS) or a multimedia message service (MMS) via a wireless mobile service provider,
  wherein the next screen region of the message-writing window is visually distinguished from the starting screen region by use of either a text scroll indication or a change in a count number displayed on the message-writing window,
  wherein the text scroll indication is a bar icon shown along an edge of the message-writing window in order to indicate an existence of text within both the starting screen region and the next screen region, and
  wherein the count number indicates a number of input characters compared with a maximum number of characters permitted for the text message and either a number of total pages of the message or a number of a current page.

13. The apparatus of claim 12, wherein each of the starting screen region and the next screen region provides a page view such that the starting screen region shows an initial page of the user inputs and the next screen region shows a subsequent page of the next user inputs.

* * * * *